(12) United States Patent
Munsterhuis (10) Patent No.: US 7,435,081 B2
(45) Date of Patent: Oct. 14, 2008

(54) METHOD AND SYSTEM FOR PILOT LIGHT SAFETY

(75) Inventor: Sybrandus B. V. Munsterhuis, Dalen (NL)

(73) Assignee: Honeywell International Inc., Morristown, NJ (US)

( * ) Notice: Subject to any disclaimer, the term of this patent is extended or adjusted under 35 U.S.C. 154(b) by 612 days.

(21) Appl. No.: 10/983,778

(22) Filed: Nov. 8, 2004

(65) Prior Publication Data

US 2005/0161518 A1 Jul. 28, 2005

Related U.S. Application Data

(63) Continuation-in-part of application No. 10/766,107, filed on Jan. 27, 2004, now Pat. No. 7,252,502.

(51) Int. Cl.
*F23N 1/00* (2006.01)
(52) U.S. Cl. .................... 431/42; 431/58; 431/60; 137/65; 236/1 A; 236/1 H; 236/15 R
(58) Field of Classification Search .............. 431/42, 431/45, 47, 56, 60, 58, 51, 80; 137/66, 485, 137/487.5, 65, 94, 495, 613, 614.11; 122/448.1, 122/448.2; 236/1 A, 1 H, 15 R, 15 A
See application file for complete search history.

(56) References Cited

U.S. PATENT DOCUMENTS

| | | | | |
|---|---|---|---|---|
| 2,009,193 A * | 7/1935 | Hegwein et al. | ........... | 236/25 R |
| 2,268,959 A * | 1/1942 | Ray | ............. | 431/56 |
| 2,390,172 A * | 12/1945 | Ray | ............. | 431/44 |
| 2,411,230 A * | 11/1946 | Ray | ............. | 431/44 |
| 2,437,894 A * | 3/1948 | Ray | ............. | 431/44 |
| 2,442,145 A * | 5/1948 | Ray | ............. | 431/58 |
| 2,446,718 A * | 8/1948 | Ray | ............. | 431/47 |
| 2,456,147 A * | 12/1948 | Ray | ............. | 431/29 |
| 2,494,833 A * | 1/1950 | Ray | ............. | 136/220 |
| 2,512,173 A * | 6/1950 | Ray | ............. | 431/56 |
| 2,529,740 A * | 11/1950 | Ray | ............. | 431/56 |
| 2,533,625 A * | 12/1950 | Ray | ............. | 431/47 |
| 2,601,321 A * | 6/1952 | Ray | ............. | 431/29 |
| 2,615,511 A * | 10/1952 | Ray | ............. | 431/58 |
| 2,652,109 A * | 9/1953 | Ray | ............. | 431/58 |
| 2,753,931 A * | 7/1956 | Ray | ............. | 431/58 |
| 2,850,030 A * | 9/1958 | Guelson | ............. | 137/66 |
| 2,939,523 A * | 6/1960 | Ray | ............. | 431/58 |
| 3,151,660 A * | 10/1964 | Evraets | ............. | 431/58 |
| 3,373,765 A * | 3/1968 | McCarty | ............. | 137/489 |
| 3,414,010 A * | 12/1968 | Sparrow | ............. | 137/495 |
| 3,433,409 A * | 3/1969 | Wright et al. | ............. | 236/9 R |
| 3,552,430 A * | 1/1971 | Love | ............. | 137/495 |
| 3,592,225 A * | 7/1971 | Graham et al. | ............. | 137/495 |
| 3,666,173 A * | 5/1972 | Ray | ............. | 236/15 A |
| 3,688,981 A * | 9/1972 | Sidaris | ............. | 236/80 R |
| 3,809,313 A | 5/1974 | Branson | | |

(Continued)

*Primary Examiner*—Carl D Price (57) ABSTRACT

A gas valve includes a gas inlet in fluid communication with a first chamber, a second chamber in selective fluid communication with the first chamber, a gas outlet in selective fluid communication with the second chamber, a pilot light outlet in fluid communication with the second chamber, and a bypass channel in fluid communication with the second chamber and in fluid communication with the first chamber. The bypass channel limits bypass gas flow to an amount that is insufficient to ignite a pilot flame at the pilot light outlet when the second channel is in fluid communication with the gas outlet.

17 Claims, 10 Drawing Sheets

MANUAL PILOT POSITION

U.S. PATENT DOCUMENTS

| | | | |
|---|---|---|---|
| 3,973,576 A | 8/1976 | Dietiker et al. | |
| 4,303,384 A | 12/1981 | Barnes | |
| 4,413,975 A | 11/1983 | Turner et al. | |
| 4,622,999 A * | 11/1986 | Ray | 137/601.01 |
| 4,624,632 A | 11/1986 | Barnes et al. | |
| 4,696,639 A * | 9/1987 | Bohan, Jr. | 431/59 |
| 4,832,070 A | 5/1989 | James et al. | |
| 4,850,530 A * | 7/1989 | Uecker | 236/1 EB |
| 5,203,688 A | 4/1993 | Dietiker | |
| 5,407,128 A | 4/1995 | Schultz | |
| 5,503,549 A | 4/1996 | Iasella | |
| 6,032,693 A * | 3/2000 | Home | 137/870 |
| 6,637,669 B2 | 10/2003 | Areso | |
| 6,932,101 B2 * | 8/2005 | Home | 137/66 |
| 7,252,502 B2 * | 8/2007 | Munsterhuis | 431/58 |
| 2004/0075070 A1 | 4/2004 | Munsterhuis | |
| 2004/0173600 A1 | 9/2004 | Munsterhuis et al. | |
| 2004/0176859 A1 | 9/2004 | Chian et al. | |
| 2004/0200530 A1 | 10/2004 | Dalton et al. | |
| 2005/0041437 A1 | 2/2005 | Chian et al. | |
| 2005/0161516 A1 * | 7/2005 | Munsterhuis | 236/1 A |
| 2006/0137749 A1 * | 6/2006 | Bonne et al. | 137/613 |

* cited by examiner

METHOD AND SYSTEM FOR PILOT LIGHT SAFETY

CROSS-REFERENCE

This application is a continuation-in-part of U.S. patent application Ser. No. 10/766,107, filed Jan. 27, 2004, now U.S. Pat. No. 7,252,502, which is incorporated by reference herein.

BACKGROUND

1. Field of the Invention

The present invention relates generally to a controller, and more particularly relates to a control system for controlling an appliance, such as a gas-fired heating device.

2. Description of the Related Art

Gas-powered appliances typically have some control system included for controlling the operation of the appliance. In this context, a gas-powered appliance may be a water heater, a fireplace insert, or a furnace, for example. Also in this context, "gas-powered" typically means that natural gas or liquid propane gas is used as a primary fuel source. Current control systems used in gas-powered appliances are typically powered by a source external to the appliance, or take the form of a thermo-mechanical system, of which both approaches have certain disadvantages.

In this respect, appliances with external power sources may be difficult to use in certain situations due to availability and/or proximity of a suitable power source. Additionally, such systems typically do not function in the event of a power outage, which is undesirable. While a thermo-mechanical back-up control system may be included in such an appliance, that approach may be overly redundant and cost prohibitive in a commercial application.

Likewise, gas-powered appliances that employ thermo-mechanical controls, while not using an external power supply, can also have certain disadvantages. Such thermo-mechanical controls are typically inaccurate due to machining tolerances, mechanical hysteresis and the use of only a single temperature sensing location due to the impracticability of multiple sensor configurations.

Based on the foregoing, alternative approaches may be desirable.

SUMMARY

According to the exemplary embodiments, a method of using a controller to prevent ignition of a pilot flame includes the steps of providing a gas valve. The gas valve includes a gas inlet in fluid communication with a first chamber, a second chamber in selective fluid communication with the first chamber, a gas outlet in selective fluid communication with the second chamber, a pilot light outlet in fluid communication with the second chamber, and a bypass channel in fluid communication with the second chamber and in fluid communication with the first chamber. A first gas flow amount can be provided from the first chamber into the bypass channel to the second chamber, and at least a portion of the first gas flows to the gas outlet and a remaining portion of the first gas flows to the pilot outlet. The remaining portion of the first gas flow amount being insufficient to ignite a pilot flame An apparatus in accordance with the exemplary embodiments can include a gas valve having a gas inlet in fluid communication with a first chamber; a second chamber in selective fluid communication with the first chamber; a gas outlet in selective fluid communication with the second chamber; a pilot light outlet in fluid communication with the second chamber; and a bypass channel in fluid communication with the second chamber and in fluid communication with the first chamber. The bypass channel limits bypass gas flow to an amount that is insufficient to ignite a pilot flame at the pilot light outlet when the second channel is in fluid communication with the gas outlet.

Another apparatus includes a gas valve including a gas inlet in fluid communication with a first chamber, a second chamber in selective fluid communication with the first chamber, a gas outlet in selective fluid communication with the second chamber, a pilot light outlet in fluid communication with the second chamber, and a bypass channel in fluid communication with the second chamber and in fluid communication with the first chamber. The bypass channel includes a fixed orifice having cross-sectional area in a range of 0.1 to 0.3 or 0.2 to 0.3 $mm^2$ and limits bypass gas flow to an amount that is insufficient to ignite a pilot flame at the pilot light outlet when the second chamber is in fluid communication with the gas outlet.

Other examples are possible as well.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

It should be appreciated that while exemplary embodiments are described with particular reference to an appliance control system for controlling a gas-fired water heating device, the present invention is contemplated for use with other appliances, including those which generate heat using electricity, a heat pump, oil, and the like. In addition, the gas-fired heating appliance may use a variety of suitable ignition systems, including standing pilot ignition, spark ignition, and hot surface ignition.

Figure 1:
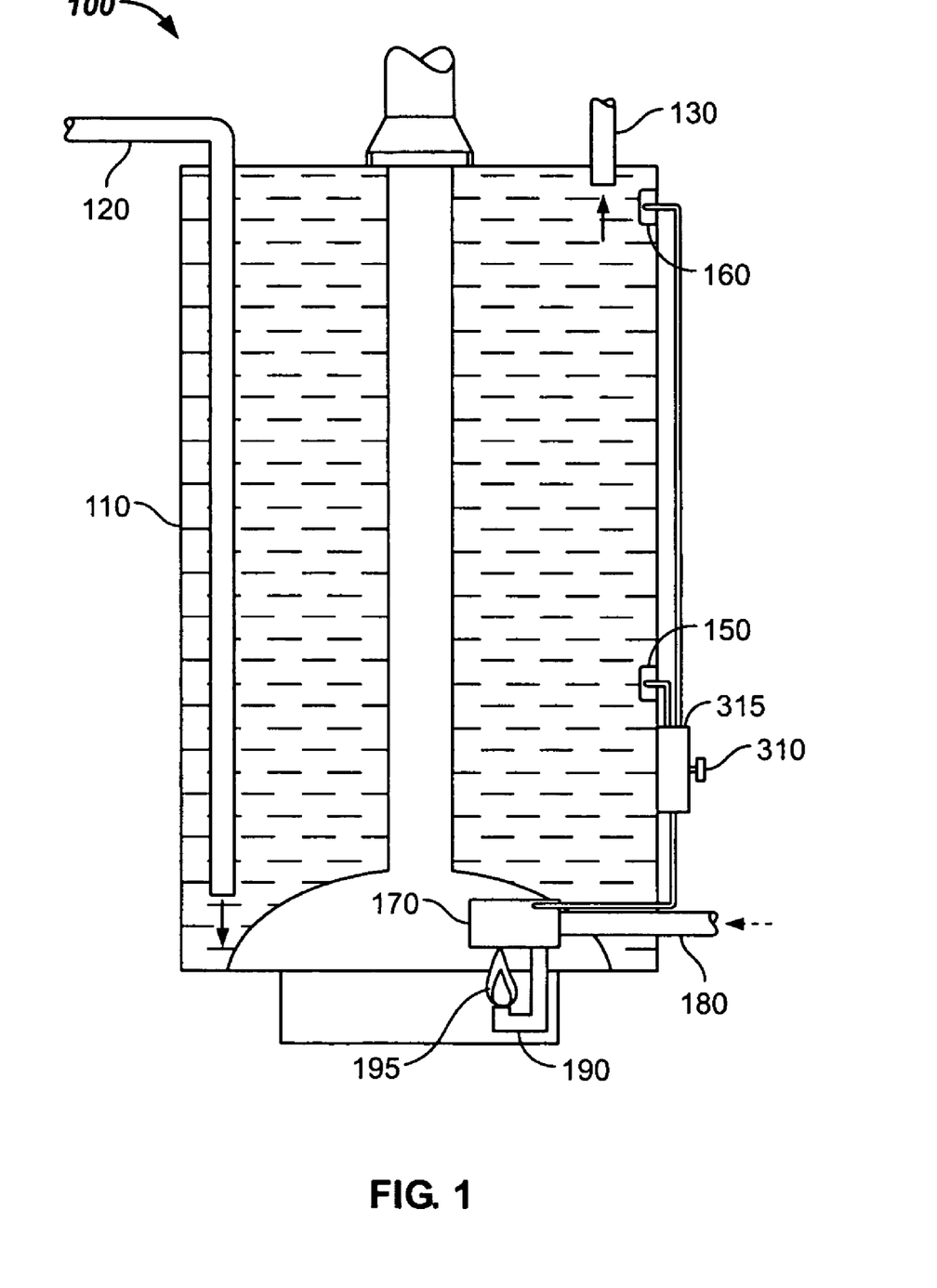
FIG. 1 is an illustration of a water heater according to an exemplary embodiment.

Referring now to the drawings, which illustrate exemplary embodiments only and are not for purposes of limiting the claims, FIG. 1 depicts an exemplary embodiment of a water heating device ("water heater") 100. Water heater 100 might include a storage tank 110 for storing water that has been, or is to be heated. Water heater 100 might also include a water supply feed pipe (typically cold water) 120, and a hot water exit pipe 130. Additionally, water heater 100 might include a housing 315, a selectable input device 310 coupled to a control circuit 200 (shown in FIG. 2), and temperature sensors 150 and 160. Information, such as water temperature within tank 110 and/or a preferred water temperature might be communicated, respectively, by temperature sensors 150 and 160 and the input device 310 to the control circuit 200.

In an exemplary embodiment, such information is communicated using electrical signals. In this regard, one or more thermal detection devices 170 (which might comprise one or more thermo-electric temperature detection devices) might power input device 310/control circuit 200. While the exemplary embodiments will be described in further detail with respect to FIGS. 2-11, briefly, employing a thermally powered control circuit, such as input device 310/control circuit 200, with water heater 100 can overcome at least some of the foregoing described disadvantages, such as use of external power.

For water heater 100, a gas supply line 180, gas valve 300, one or more pilot burners 190, and a first pilot gas valve, such as a manual pilot gas valve 390 (as shown in FIGS. 4-7), might also be coupled to input device 310/control circuit 200. In this regard, burner 190 might produce a pilot flame 195. Thermal energy supplied by pilot flame 195 might be converted to electric energy by the one or more thermal detection devices 170. This electrical energy might then be used by thermally powered input device 310/control circuit 200 to operate water heater 100, as is described in further detail hereinafter. Water heater 100 might further include a main burner (not shown)/main burner gas valve 300 (shown in FIGS. 4-7), which might provide thermal energy for heating water contained within tank 110.

Figure 2:
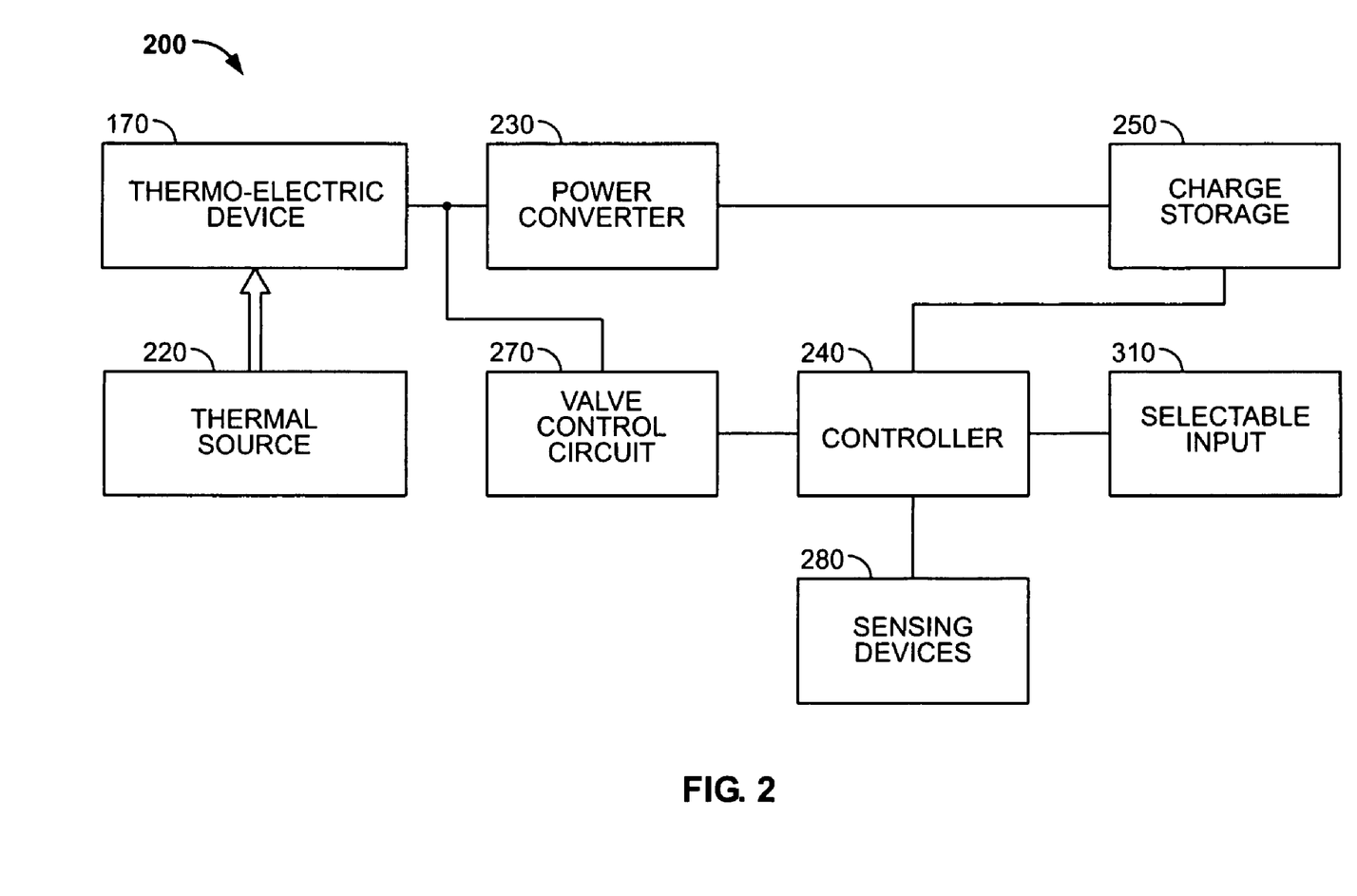
FIG. 2 is a block diagram of a thermally powered control circuit and power management system according to an exemplary embodiment.

FIG. 2 depicts a block diagram of an embodiment of a thermally powered control circuit 200 including a power management system in accordance with an exemplary embodiment. Circuit 200 might be used in water heater 100, for example, although other examples are possible. Features and aspects of the embodiment shown in FIG. 2 will be discussed briefly with reference to circuit 200, and a more detailed description of power management systems can be found in commonly owned U.S. Patent Application Publication No. 2004/0176859, the entire disclosure of which is incorporated by reference herein.

In this regard, circuit 200 might include the one or more thermal detection devices 170 that can be in thermal communication with a thermal source 220 (which might comprise the pilot flame 195). In this context, thermal communication can mean, for example, that the one or more thermal detection devices 170 and thermal source 220 are in close enough physical proximity with each other, such that thermal energy generated by thermal source 220 might be absorbed by, or communicated to, the one or more thermal detection devices 170. In this respect, thermal energy communicated to the one or more thermal detection devices 170 from thermal source 220, in turn, might result in the one or more thermal detection devices 170 producing an electric voltage potential. In an exemplary embodiment, each of the one or more thermal detection devices 170 might comprise one or more thermopiles.

As is shown in FIG. 2, the one or more thermal detection devices 170 might be coupled with power converter 230. Power converter 230, which will be discussed in further detail below, can modify the voltage potential produced by the one or more thermal detection devices 170. In an exemplary embodiment, because the voltage potential produced by the one or more thermal detection devices 170 is lower than desired for operating most circuit components, power converter 230 can be a step-up power converter, as described in commonly owned U.S. patent application Ser. No. 10/642,531, Honeywell docket number H0004031, the entire disclosure of which is incorporated by reference herein.

Power converter 230 might be further coupled with a controller 240 and a charge storage device 250. While the exemplary embodiments are not limited in scope to the use of any particular controller, controller 240 might take the form of an ultra-low power microcontroller, for example. Such microcontrollers are available from Texas Instruments, Inc., 12500 TI Boulevard, Dallas, Tex. 75243 as the MSP430 product family, though, as previously indicated, other examples are possible as well. Charge storage device 250 might comprise circuit components, such as, for example, capacitors to store charge for use by controller 240, and for use in stepping up the voltage potential generated by the one or more thermal detection devices 170.

Circuit 200 might also include a valve control circuit 270. Valve control circuit 270 might be coupled with controller 240 such that controller 240 can initiate and/or control opening and/or closing of one or more gas valves associated with valve control circuit 270, during normal operation of, for example, water heater 100. In an exemplary embodiment, valve control circuit 270 and controller 240 might control electric servo valves that can in turn initiate and/or control the opening and/or closing of one or more gas valves. Methods that might be executed by controller 240 for operating, for example, water heater 100, are described in commonly owned Patent Application Publication No. 2004/0173600, the entire disclosure of which is incorporated by reference herein.

Circuit 200 might still further include one or more sensing devices 280 (which might comprise temperature sensors 150 and 160) and an input selection device 310, which might be coupled with controller 240. Sensing devices 280 might take the form of negative temperature coefficient ("NTC") thermistors, which, for the embodiment illustrated in FIG. 1, might sense water temperature within storage tank 110. Controller 240 might then compare information received from sensing devices 280 with a threshold value that is based on a setting of input device 310. Based on this comparison, controller 240 might initiate valve control circuit 270 to power a main burner valve to heat water within water heater 100. Alternatively, for example, controller 240 might initiate valve control circuit 270 to close a main burner valve to end a heating cycle in water heater 100. As was previously indicated, the exemplary embodiments are not limited to use with a water heater, and may be used in other applications, such as with furnaces or fireplaces. In such applications, sensing devices 280 might sense, for example, room temperature or temperatures at other locations, as opposed to water temperature.

Figure 3:
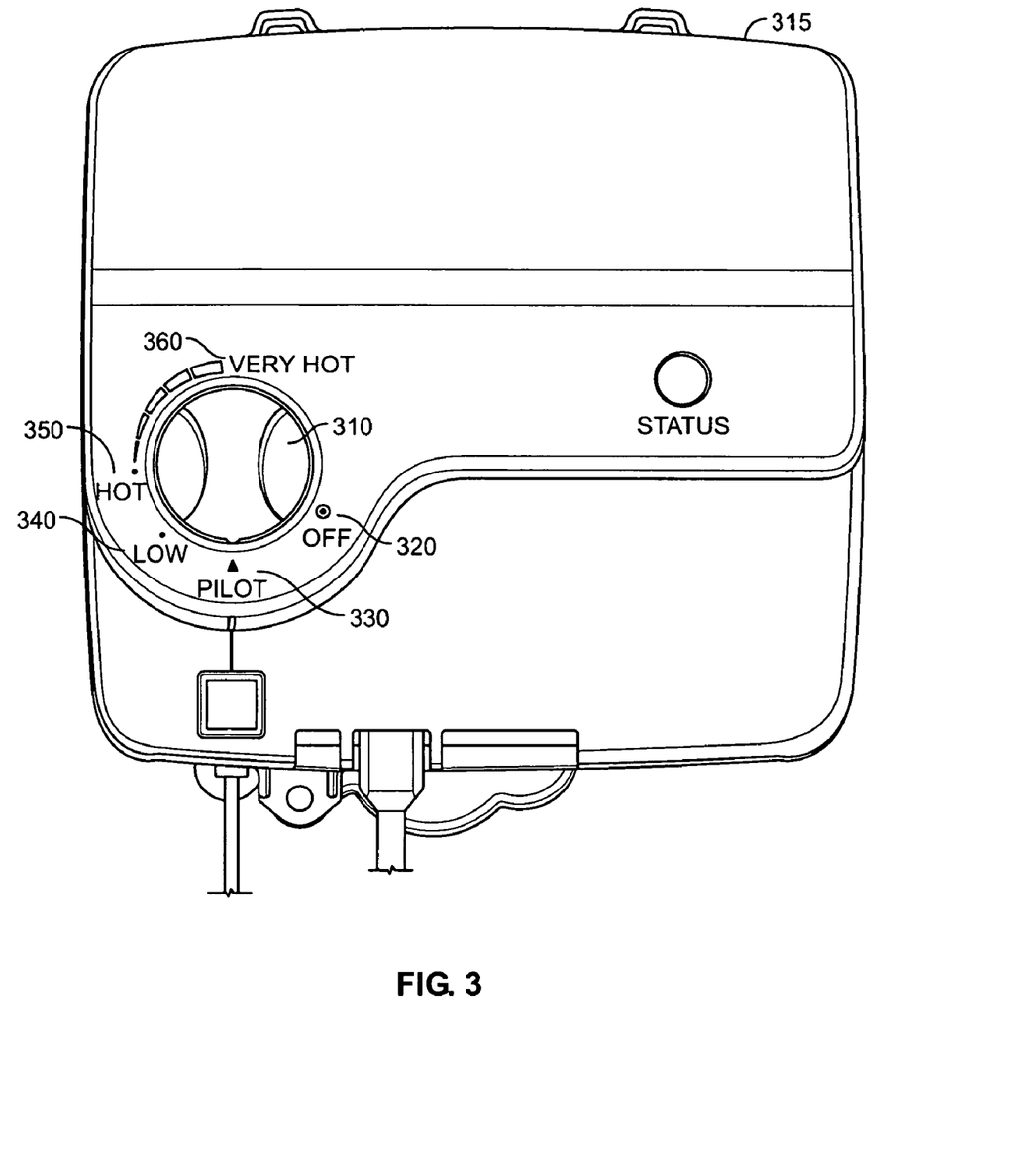
FIG. 3 is an illustration of an exemplary selectable input device in accordance with an exemplary embodiment.

FIG. 3 depicts the housing 315 and the input device 310. In an exemplary embodiment, the input device 310 can rotate to different positions or settings, such as an off position 320, a pilot position 330, a low position 340, a hot position 350, and a very hot position 360. Further, these positions might have other settings or positions between them. For example, the hot position 350 and the very hot position 360 might have temperature settings between them, as depicted in the exemplary embodiment of FIG. 3. In an exemplary embodiment, the position of the input device 310 can signal or control other components of a pilot control system. For example, if the input device 310 is set to the off position 330, the pilot control system might also be "off" (for example, not powered and no gas flow).

FIGS. 4, 5, 6, and 7, depict a pilot control system in an off position, a manual position, an automatic pilot position (main valve "on"), and an automatic pilot position (standby), respectively. In an exemplary embodiment, the valve control circuit 270 coupled with the controller 240 might control the flow of a gas 365 through a pilot control system by regulating the gas flow through one or more flow chambers to one or more pilot and/or main burner outlets.

For example, an exemplary pilot control system might comprise three flow chambers: a first, second, and third flow chamber (375, 450, and 530, respectively). The first flow chamber 375 might, in turn, comprise an inlet 370, and the third flow chamber 530 might, in turn, comprise a main burner outlet 380. The exemplary pilot control system might also comprise a pilot burner outlet 470. In an exemplary embodiment, a pilot pressure regulator 460 can regulate the pressure at the pilot burner outlet 470, and a main pressure regulator 610 can regulate the pressure at the main burner outlet 380. Other examples are possible, as well.

Figure 4:
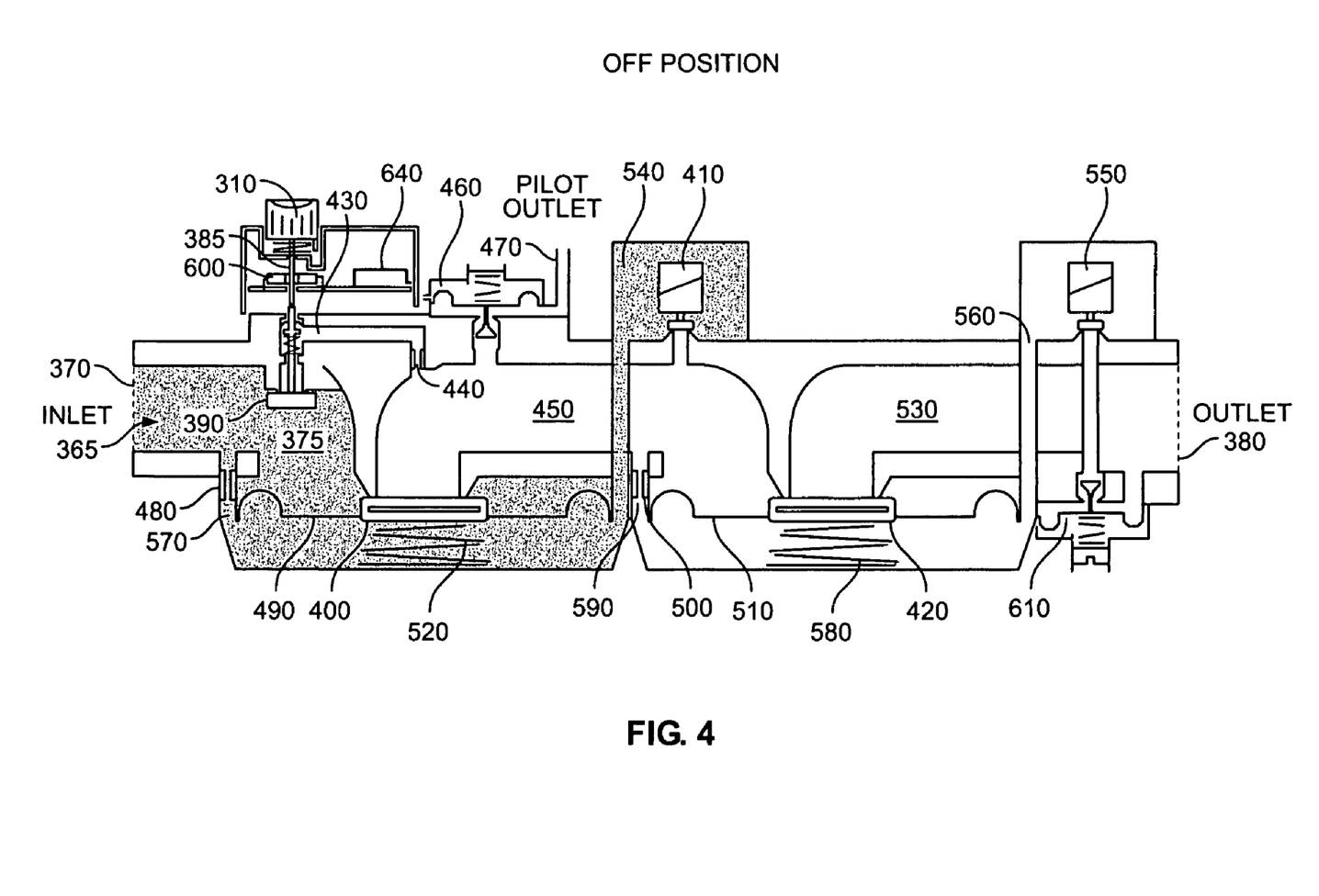
FIG. 4 is an illustration of an exemplary embodiment in an exemplary off position.

Looking at FIG. 4, for example, to control the flow of gas 365 through the flow chambers, an exemplary pilot control system might also comprise a first pilot gas valve, such as a manual pilot valve 390, a second pilot gas valve, such as an automatic pilot valve 400, and a main valve 420. These valves might then be used to control the flow of the gas 365 to various components of the gas control system.

In an exemplary embodiment, the manual pilot valve 390 might open and close to control gas flow from the first flow chamber 375 to an automatic pilot valve bypass 430. The automatic pilot valve bypass 430 might bypass the automatic pilot valve 400 and connect the first flow chamber 375 to the second flow chamber 450 and, hence, to the pilot outlet 470. In an exemplary embodiment, flow through the automatic pilot valve bypass 430 can be limited by a pilot flow limiting orifice 440, which, in an exemplary embodiment, has a diameter of 0.25 to 0.75 or 0.5 mm. Other examples are possible as well. By limiting the flow of gas 365 through the bypass 430 to the second flow chamber 450, the orifice 440 can limit the gas pressure in the second flow chamber 450 to less than the gas pressure in the first flow chamber 375.

The manual pilot valve 390 might be connected to the input device 310 via, for example, a shaft 385. The shaft 385, in turn, might be connected to a position detector or a switched input detecting contact, such as, for example, a potentiometer 600, which might be used to send an indication of the setting of the input device 310 (such as a temperature setting) to other components of the pilot control system. In an exemplary embodiment, the input device 310 might be able to be actuated (such as, for example, by being pushed down or slid). Further, the input device 310 and/or the shaft 385 might be spring loaded so that once the input device 310 is released after being actuated, it can spring back to its previous position or another position. In an exemplary embodiment, the input device 310 can only be actuated when it is in certain positions, such as the pilot position 330, for example, and the shaft 385 might be keyed such that it only allows the input device 310 to be actuated in certain positions. The input device 310 might then be actuated and released such that when it is actuated or released it acts to open or close, respectively, the manual pilot valve 390.

In an exemplary embodiment, the automatic pilot valve 400 can open and close to control gas flow from the first flow chamber 375 to the second flow chamber 450. The automatic pilot valve 400 might comprise, for example, a diaphragm valve, although other examples are possible. In the case of a diaphragm valve, the automatic pilot valve 400 might comprise an automatic pilot valve diaphragm 490 and an automatic pilot valve spring 520.

There are various means of controlling the actuation, or the opening and closing, of the automatic pilot valve 400. To close the automatic pilot valve 400, or maintain the automatic pilot valve 400 in the closed position, the automatic pilot valve spring 520 can be biased toward the closed position. Further, in the exemplary diaphragm valve embodiment, the underside of the automatic pilot valve diaphragm 490 might be connected to an automatic pilot valve supply 570, which in turn might comprise an automatic pilot valve supply orifice 480. Gas 365 might then flow to the underside of the diaphragm 490 through the supply 570 (limited by the orifice 480), and the gas pressure on the underside of the automatic pilot valve diaphragm 490 might, in turn, act on the diaphragm 490 to tend to close the automatic pilot valve 400.

One means of releasing the gas pressure on the underside of the automatic pilot valve diaphragm 490 is through the use of an electric servo operator automatic pilot valve 410, for example. In an exemplary embodiment, the electric servo operator valve 410 can open and close to control gas flow from an electric servo operator automatic pilot valve supply 540 to the second flow chamber 450. By opening the servo valve 410, gas 365 can flow from the underside of the automatic pilot valve diaphragm 490 toward the second flow chamber 450, and this gas flow, in turn, can act to release gas pressure from the underside of the automatic pilot valve diaphragm 490. The supply orifice 480 can be sized to limit gas flow to and regulate re-pressurization of the underside of the diaphragm 490. Other examples of releasing the pressure and/or opening the automatic pilot valve 400 are possible as well.

In an exemplary embodiment, the main valve 420 can open and close to control gas flow from the second flow chamber 450 to the third flow chamber 530 and to the main burner (not shown). The main valve 420 might comprise, for example, a diaphragm valve, although other examples are possible. In the case of a diaphragm valve, the main valve 420 might comprise a main valve diaphragm 510 and a main valve spring 580.

There are various means of controlling the actuation, or the opening and closing, of the main valve 420. To close the main valve 420, or maintain the main valve 420 in the closed position, the main valve spring 580 can be biased toward the closed position. Further, in the exemplary diaphragm valve embodiment, the underside of the main valve diaphragm 510 might be connected to a main valve supply 590, which in turn might comprise a main valve supply orifice 500. Gas 365 might then flow to the underside of the diaphragm 510 through the supply 590 (regulated by the orifice 500), and the gas pressure on the underside of the main valve diaphragm 510 might, in turn, act on the diaphragm 510 to tend to close the main valve 420.

One means of releasing the gas pressure on the underside of the main valve diaphragm 510 is through the use of an electric servo operator main valve 550, for example. In an exemplary embodiment, the electric servo operator main valve 550 can open and close to control gas flow from an electric servo operator main valve supply 560 to the third flow chamber 530. By opening the servo valve 550, gas 365 can flow away from the underside of the main valve diaphragm 510, and this gas flow, in turn, can act to release gas pressure from the underside of the main valve diaphragm 510. The supply orifice 500 can be sized to limit gas flow to and regulate re-pressurization of the underside of the diaphragm 510. Other examples of releasing the pressure and/or opening the main valve 420 are possible as well.

FIG. 4 depicts an exemplary pilot control system in an exemplary off position, which might result when the input device 310 is set to the off position 320. In an exemplary embodiment, in the off position 320, the manual pilot valve 390 and the automatic pilot valve 400 are closed and can oppose the flow of gas 365 through these valves to downstream components, such as other flow chambers. In the off position, gas 365 can occupy the first chamber 375 and the underside of the automatic pilot valve diaphragm 490. In the exemplary pilot control system depicted in FIG. 4, gas can also occupy the supply 540 up to but not beyond the electric servo operator valve 410, which is also closed.

Figure 5:
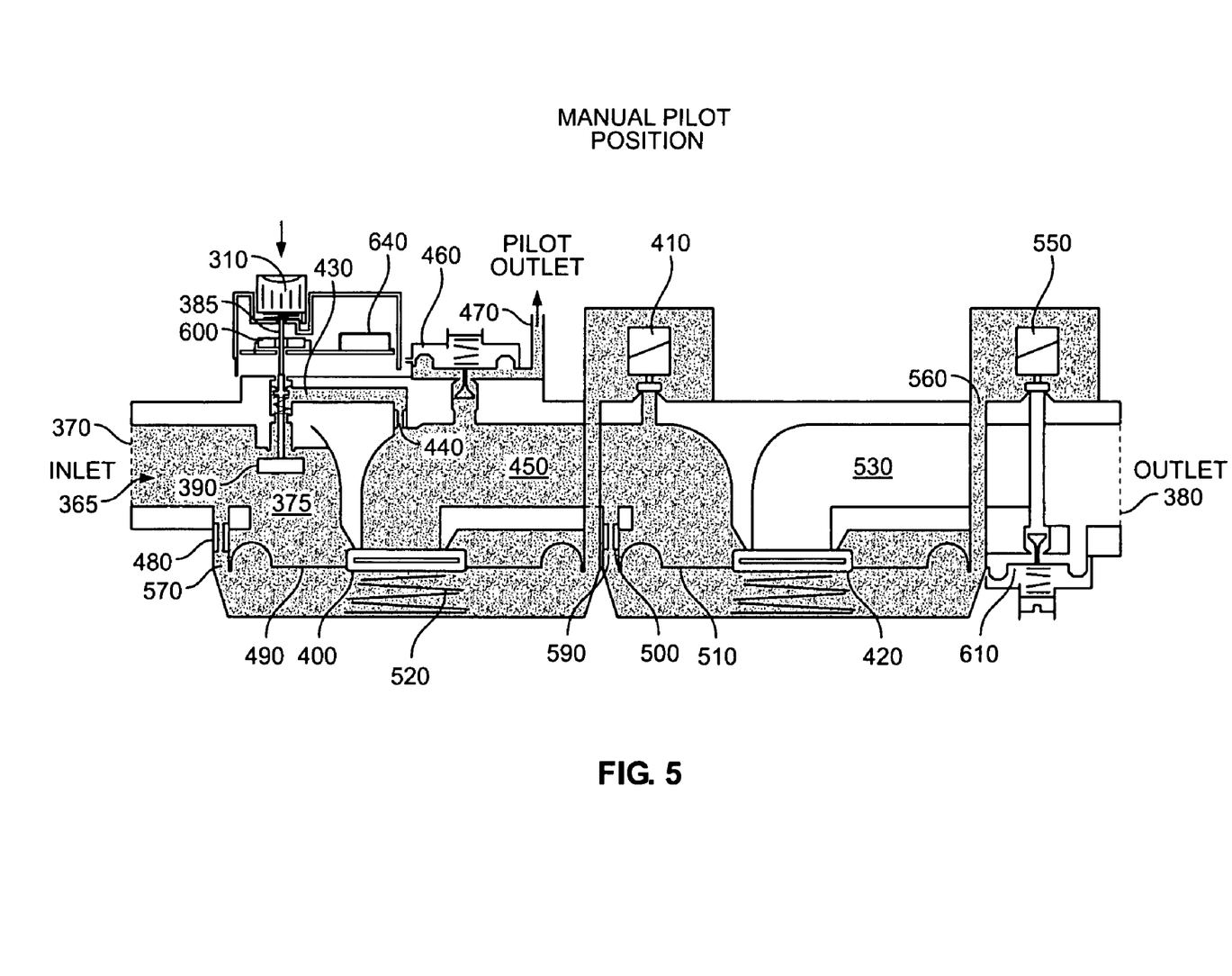
FIG. 5 is an illustration of an exemplary embodiment in an exemplary manual pilot position.

FIG. 5 depicts an exemplary pilot control system in the manual pilot position, which might result when the input device 310 is set to the pilot position 330. In an exemplary embodiment, in the pilot position 330, the input device 310 can be pushed such that the action of pushing the input device 310 opens the manual pilot valve 390. While the manual pilot valve 390 is open, gas 365 can enter the automatic pilot valve bypass 430 and flow to downstream components such as the second flow chamber 450, the pilot pressure regulator 460, and the pilot outlet 470. In the manual pilot position, gas 365 can flow through the main valve supply 590 to the underside of the main valve diaphragm 510. In the exemplary pilot control system depicted in FIG. 5, gas 365 can also flow through the electric servo operator main valve supply 560 up to but not through the electric servo operator main valve 550, which is also closed.

The pilot pressure regulator 460 can regulate gas flow to the pilot outlet 470. Once gas 365 is flowing to the pilot outlet 470, the pilot flame 195 (shown in FIG. 1) can be ignited using any of a number of different ignition means. Once the pilot flame 195 is lit, the flame can heat one or more thermal detection devices 170, such as one or more thermopiles, for example. In an exemplary embodiment, the thermopile(s) might each comprise an array of about thirty thermocouples, for example. Other examples are possible, as well. In any case, the one or more thermal detection devices 170 might also be connected to the controller 240. In an exemplary embodiment, when the pilot flame 195 is lit, the one or more thermal detection devices 170 can provide an output voltage to the controller 240, which the controller 240 might then use as power for the control system. When the pilot flame 195 is not lit, in an exemplary embodiment, the one or more thermal detection devices 170 do not provide any output voltage.

The controller 240, in turn, might comprise or be coupled with a microprocessor 640. And once the output voltage of the one or more thermal detection devices 170 reaches a certain point, the microprocessor 640 might activate. In an exemplary embodiment, the output voltage from the one or more thermal detection devices 170 might supply a step-up power converter. In any case, in an exemplary embodiment, the controller 240 and/or the microprocessor 640 might comprise one or more control algorithms for controlling various components of the control system. The microprocessor 640 might then use the power provided by the one or more thermal detection devices 170 to control various components of the pilot control system, such as the electric servo valves 410 and 550, for example. In an exemplary embodiment, the microprocessor 640 can be programmed to open the servo valve 410 once the one or more thermal detection devices 170 reaches a certain temperature, or voltage.

FIG. 5 illustrates an exemplary gas valve apparatus where the gas inlet 370 is in fluid communication with the first chamber 375. A second chamber 450 is in selective fluid communication with the first chamber 375. In this embodiment, a pilot valve 400 provides the selective fluid communication means between the first chamber 375 and the second chamber 450. A gas outlet 380 is in selective fluid communication with the second chamber 450. In this embodiment, a main supply valve 420 provides the selective fluid communication means between the second chamber 450 and the gas outlet 380. A pilot light outlet 470 is in fluid communication with the second chamber 450. In this embodiment, a pressure regulator is disposed between the second chamber 450 and the pilot outlet 470. A bypass channel 430 is in fluid communication with the second chamber 450 and in fluid communication with the first chamber 375. In this embodiment, the bypass channel 430 limits gas flowing through the bypass channel 430 or bypass gas flow to an amount that is insufficient to sustain a pilot flame 195 at the pilot light outlet 470 when the second channel 450 is in fluid communication with the gas outlet 380. In this embodiment, the bypass channel 430 includes an orifice 440 or fixed orifice 440 sized to limit the amount of gas flowing through the bypass channel 430. A valve can be disposed within the bypass channel 430 configured to seal the bypass channel 430 from the first chamber 375.

This construction allows a user to manually bypass the pilot valve 400 with a controlled amount of gas flow, an amount sufficient to ignite a flame at or near the pilot outlet 470 while preventing ignition of a pilot flame or main burner flame if the main valve 420 is in an open position. If the main valve 420 allows at least a portion of this bypass gas flow to exit to the gas outlet, the remaining amount of bypass gas flow is insufficient to ignite a pilot flame 195. A user would be unable to ignite a pilot flame 195 and would be forced to investigate the problem. The flow limiting bypass 430 and orifice 440 limits gas flow to a safe amount for lighting the pilot light 195, but if the main valve is at least partially open, the pilot light 195 cannot be lit.

The flow limiting bypass 430 and orifice 440 can allow a bypass or first gas flow amount into the second chamber 450. In some embodiments, this bypass or first gas flow amount is an amount just sufficient to ignite a flame at the pilot outlet 470 but this amount is insufficient to ignite a flame at the gas outlet 380. It is assumed herein that the gas outlet 380 is in gas flow or fluid communication with a main burner, thus an amount of gas insufficient to ignite a flame at the gas outlet 380 will not ignite a flame at the main burner. A portion of the first gas flow can be in fluid communication with the pilot outlet 470 and a remaining portion of the first gas flow can be in fluid communication with the gas outlet 380, in this condition the amount of gas flowing to both the pilot outlet 470 and the gas outlet is insufficient to ignite a flame at either the pilot outlet 470 or gas outlet 380, respectively.

In some embodiments, the gas inlet 370 and gas outlet 380 have a cross-sectional area from 100 to 150 $mm^2$, or 125 $mm^2$; the bypass channel 430 has a cross-sectional area from 3 to 6 $mm^2$ and the fixed orifice 440 has a cross-sectional area in a range of 0.1 to 0.3 or 0.2 to 0.3 $mm^2$; the pilot outlet 470 has a cross-sectional area in a range of 0.07 to 0.12 $mm^2$ when used with natural gas and a cross-sectional area in a range of 0.03 to 0.07 $mm^2$ when used with LP gas. In illustrative embodiments, gas can flow into the gas inlet at a rate of 30,000 to 100,000 BTU/hr and at a pressure of 1.2 to 2.5 kPa (for natural gas) or at a pressure of 2.5 to 3.7 kPa (for LP gas); gas can flow out of the gas outlet at a rate of 30,000 to 100,000 BTU/hr and at a pressure of 1 to 1.2 kPa (for natural gas) or at a pressure of 2.5 to 2.7 kPa (for LP gas); both the bypass channel 430 or fixed orifice 440 and the pilot outlet 470 can flow gas at a rate of 350 to 550 BTU/hr. Thus, in this illustrative embodiment, if the gas flow through the pilot outlet 470 is less than 350 to 550 BTU/hr, or 0 to 350 BTU/hr, the pilot light would fail to light, indicating that a portion of the gas flowing through the bypass channel 430 or fixed orifice 440 is passing through the gas outlet 380.

Figure 6:
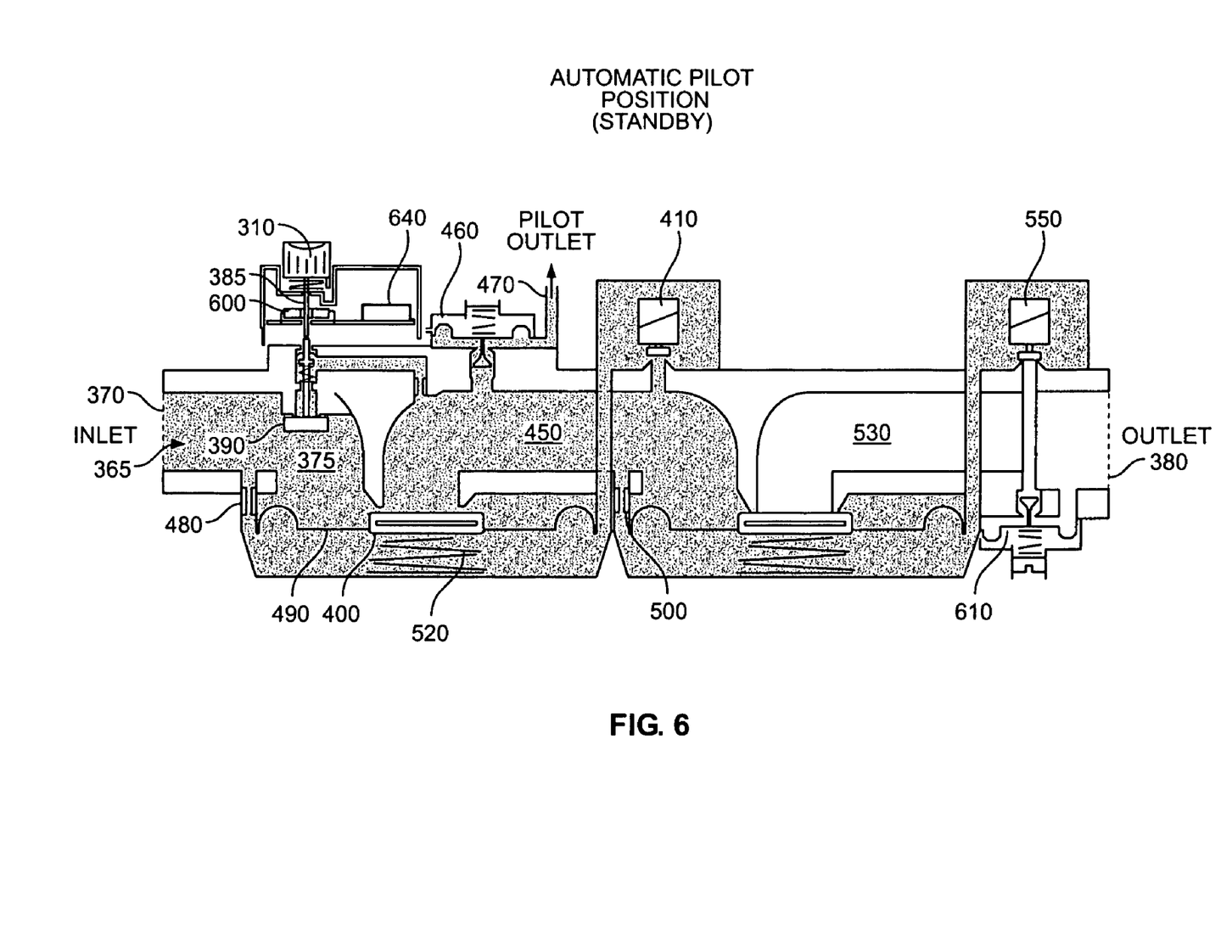
FIG. 6 is an illustration of an exemplary embodiment in an exemplary automatic pilot standby position.

Turning to FIG. 6, FIG. 6 depicts an exemplary pilot control system in the automatic pilot standby position. In an exemplary embodiment, the automatic pilot standby position can result after the performance of the series of steps discussed with respect to FIG. 5: First, the input device 310 can be set to the pilot position 330 and actuated to open the manual pilot valve 390. Second, the pilot flame 195 (supplied with the gas 365 by the pilot outlet 470) can be ignited and can heat the one or more thermal detection devices 170 to a temperature that generates enough power to activate the microprocessor 640. Then, as depicted in the exemplary embodiment of FIG. 6, the microprocessor 640 can open the electric servo operator valve 410 and the input device 310 can be released to close the manual pilot valve 390.

As discussed above, in an exemplary embodiment, the electric servo operator valve 410 can be opened to release gas pressure from the underside of the automatic pilot valve diaphragm 490. Gas pressure from the first flow chamber 375 and/or the second flow chamber 450 can then act on the diaphragm 490 and the automatic pilot valve 400 to oppose the force of the spring 520 and any remaining gas pressure on the underside of the diaphragm 490. The gas pressure from the first flow chamber 375 and the second flow chamber 450 can thus combine to help open the automatic pilot valve 400. Gas flow through the automatic pilot valve 400 can then supply the pilot outlet 470 and hence the pilot flame 195. In the exemplary embodiment depicted in FIG. 6, the microprocessor 640 can electrically hold the electric servo valve 410 open and, hence, maintain the exemplary pilot control system in the automatic pilot standby position, as long as the valve 410 receives power from the microprocessor 640 and/or controller 240. In an exemplary embodiment, once the input device 310 is turned to the off position 320, the power is cut to the microprocessor 640 and/or the controller 240 and, likewise, power is cut to any pilot control system components powered by the microprocessor 640 and/or the controller 240, such as the electric servo valve 410.

Figure 7:
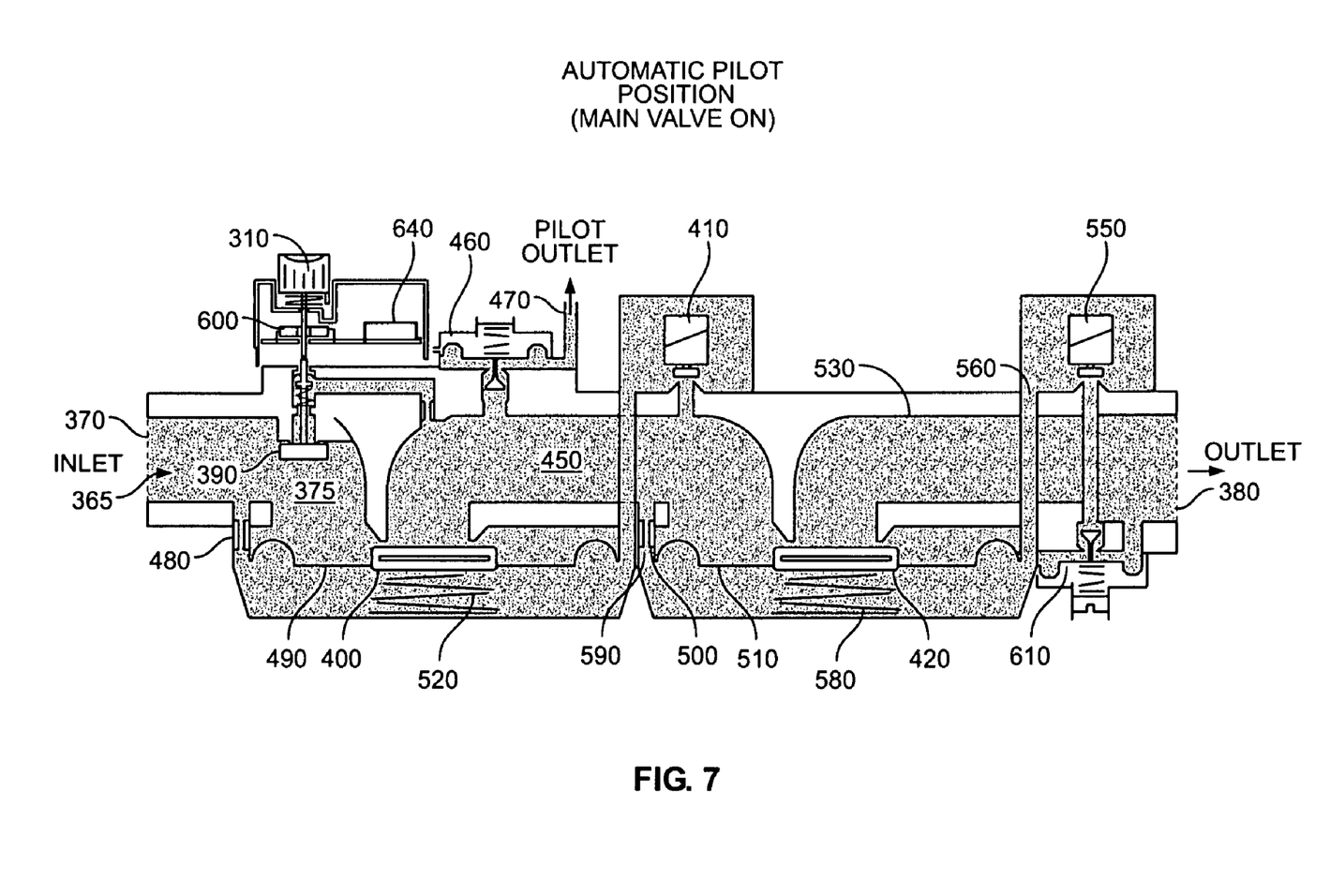
FIG. 7 is an illustration of an exemplary embodiment in an exemplary automatic pilot (main valve "on") position.

FIG. 7 depicts an exemplary pilot control system in the automatic pilot (main valve "on") position. In an exemplary embodiment, the automatic pilot (main valve "on") position can result after the automatic pilot valve 400 is opened and the input device 310 is turned to any of the low position 340, the hot position 350, and the very hot position 360, or is rotated to the temperature settings between the hot position 350 and the very hot position 360. Other examples are possible, as well.

The rotation of the input device 310 can also cause the potentiometer 600 to rotate. In an exemplary embodiment, the setting of the input device 310, and hence the potentiometer 600, can then indicate to the pilot control system, for example, the temperature setting of the input device 310 or whether the input device is set to the pilot mode or off.

In an exemplary embodiment, the microprocessor 640 can read the potentiometer 600, and based on the position of the potentiometer 600 and other inputs, the microprocessor can signal the electric servo operator main valve 550 to open, close, and/or adjust the main valve 420, as depicted in FIG. 7. As the servo valve 550 opens, it can release gas 365 from the underside of the main valve diaphragm 510 and allow the gas 365 to flow from the supply 560, through the main pressure regulator 610, and toward the third flow chamber 530 and the outlet 380. Gas pressure from the second flow chamber 450 can then act on the diaphragm 510 to oppose the force of the spring 580 and any remaining gas pressure on the underside of the diaphragm 510. The gas pressure from the second flow chamber 450 can thus help open the main valve 420. Gas flow through the main valve 420 can then supply one or more main burners.

In the exemplary embodiment depicted in FIG. 7, the microprocessor 640 can electrically hold open and adjust the electric servo valve 550, which might be open because of input from any or all of the temperature sensing devices 280, the potentiometer 600, or other temperature settings, and/or the one or more control algorithms. The microprocessor 640 can maintain the exemplary pilot control system in the automatic pilot (main valve "on") position as long as the valve 550 receives power from the microprocessor 640 and/or the controller 240. In an exemplary embodiment, once the input device 310 is turned to the off position 320, the power is cut to the microprocessor 640 and/or the controller 240 and, likewise, power is cut to any pilot control system components powered by the microprocessor 640 and/or the controller 240, such as electric servo valves 410 and 550.

Figure 8:
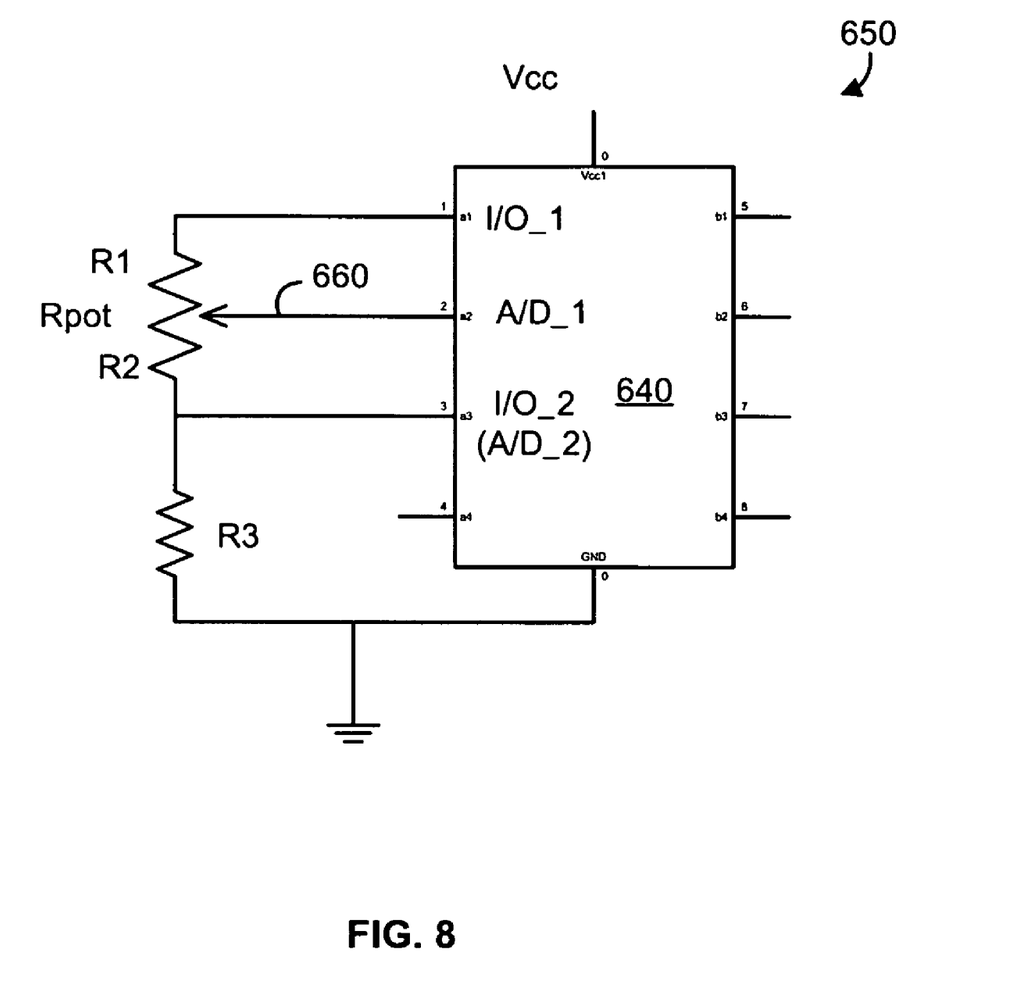
FIG. 8 is a schematic diagram of an exemplary potentiometer circuit.

FIG. 8 depicts a schematic of a circuit 650 comprising the potentiometer 600 communicating with the microprocessor 640. As shown in FIG. 8, the potentiometer 600 might comprise a wiper 660 and a plurality of resistors, such as R1 and R2, for example. Each resistor, in turn, might comprise one or more contacts. The sum of the plurality of resistors might then equal the value Rpot, or the total resistance of the potentiometer 600. In an exemplary embodiment, the wiper 660 might vary the resistance in the circuit 650 by moving between the contacts of the resistors. The potentiometer might then vary its resistance between, for example, 0Ω and Rpot.

The potentiometer 600 might be connected to the microprocessor 640 at a plurality of terminals, such as I/O_1, A/D_1, and I/O_2 (A/D_2). In an exemplary embodiment, the circuit 650, and hence the microprocessor 640, might receive power from the output voltage of the one or more heated thermal detection devices 170. As discussed above, the one or more thermal detection devices 170 might be coupled with power converter 230, which might generate a voltage Vcc. Then, as the wiper 660 slides along the plurality of resistors (R1 and R2, for example), the voltage drop across the potentiometer can be proportional to the position of the wiper 660, which, in turn, can directly correlate to the position of the input device 310.

The microprocessor 640 can be calibrated to correlate the voltage drop across the potentiometer 600 with the position of the input device 310, and, in an exemplary embodiment, the correlated voltages and positions can be stored in EEPROM. For example, the off position 320 of the input device 310 might be calibrated with a voltage drop of zero over the terminals I/O_1 and A/D_1. Likewise, the very hot position 360 of the input device 310 might be calibrated such that the voltage drop over the terminals I/O_1 and A/D_1 equals the voltage drop over the terminals I/O_1 and I/O_2 (A/D_2) or Vcc. Intermediate settings of the input device 310, such as the pilot position 330, the low position 340, and the hot position 350, for example, might also be calibrated with particular voltage drops over the terminals I/O_1 and A/D_1.

In an exemplary embodiment, the microprocessor 640 can determine the position of the input device 310 by measuring the voltage drop across the terminals I/O_1 and A/D_1 as a percentage of the voltage drop across the terminals I/O_1 and I/O_2 (A/D_2) or as a percentage of the voltage Vcc. Thus, the pilot position 330 can be calibrated to equal a particular ratio of the voltage drop over the terminals I/O_1 and A/D_1 to the voltage drop over terminals I/O_1 and I/O_2 (A/D_2).

Likewise, the low position 340, the hot position 350, the very hot position 360, and the gradient of temperature settings between the hot position 350 and the very hot position 360 can each be calibrated to equal different, particular ratios of the voltage drop over the terminals I/O_1 and A/D_1 to the voltage drop over terminals I/O_1 and I/O_2 (A/D_2). And these calibrations can be stored in EEPROM in the microprocessor 640.

The microprocessor 640, which, in an exemplary embodiment, can receive temperature feedback from the temperature sensing devices 280, can then be programmed to control, for example, gas flow to the main burner, based on the position of the input device 310. In an exemplary embodiment, the microprocessor 640 can also correlate positions of the input device 310 with temperatures in and/or around a gas-fired appliance. (The temperatures in and/or around a gas-fired appliance, in turn, might be read by the microprocessor 640 as a voltage output from the temperature sensing devices 280, for example.) The microprocessor might then store in EEPROM, for example, a correlation of calibrated voltage drop ratios and desired temperatures in and/or around a gas-fired appliance. The desired temperatures might be measured as output voltages of temperature sensing devices 280, for example. In an exemplary embodiment, to ascertain a user's desired (or selected) temperature setting, as indicated by the input device 310 (and hence the potentiometer 600), the microprocessor 640 can compare the voltage drop across terminals I/O_1 and A/D_1 to the voltage drop across terminals I/O_1 and I/O_2 (A/D_2) (as discussed above). The microprocessor 640 can then use the ratio of those two voltage drops to look up the calibrated temperature setting, which might be stored as an expected input voltage potential from the temperature sensing devices 280. The microprocessor can then compare the value of the stored expected input voltage potential to the actual input voltage potential from the temperature sensing devices 280, and adjust the burner output appropriately (by starting or stopping (or increasing or decreasing) gas flow to the burner, for example).

2. Exemplary Operation

Figure 9:
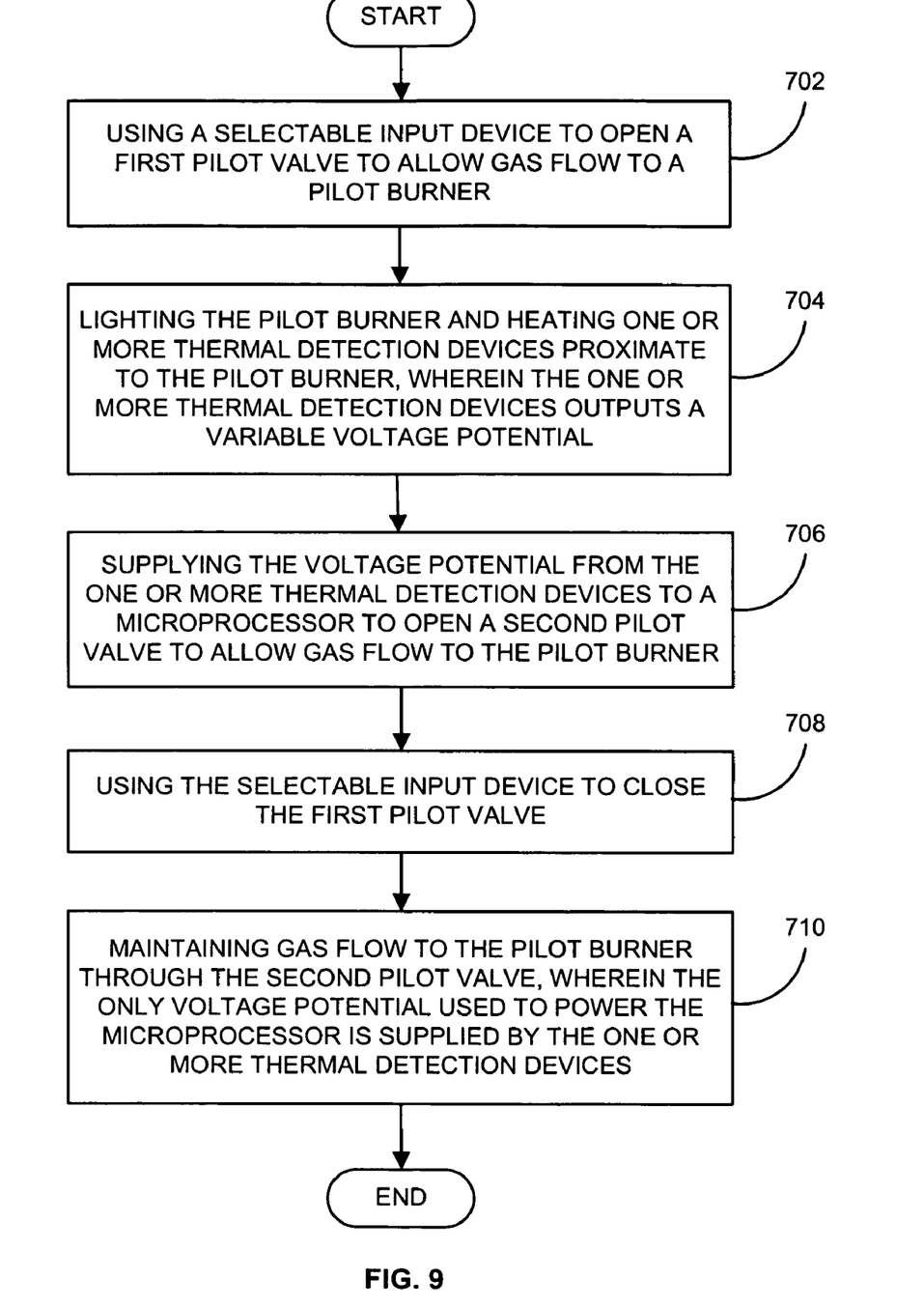
FIG. 9 is a flowchart illustrating a process carried out by a system in accordance with an exemplary embodiment.

FIG. 9 is a flowchart that depicts a set of functions that might be involved in using an exemplary pilot control system in accordance with the exemplary embodiments of FIGS. 1-8. As depicted in the exemplary embodiment of FIG. 4, when the selectable input device 310 is in the off position 320, both the manual pilot valve 390 and the automatic pilot valve 400 are closed and gas is restricted to the first chamber 375 and to the underside of the automatic pilot valve 400.

At block 702 of FIG. 9, a user can operate a selectable input device to open a manual pilot valve to allow gas flow to a pilot burner. In the exemplary embodiment depicted in FIG. 5, the input device 310 can be rotated to the pilot position 330 and can be actuated to open the manual pilot valve 390 via the shaft 385. Gas 365 can then flow through the manual pilot valve 390 and the automatic pilot valve bypass 430 to fill the second chamber 450. Gas 365 can further flow to the underside of the main valve 420 and through the pilot pressure regulator 460 and the pilot outlet 470 and to the pilot burner 190 (shown in FIG. 1).

At block 704 of FIG. 9, the pilot burner can be lit (by any ignition means now known or later developed) and can heat one or more thermal detection devices in thermal communication with the pilot burner. The one or more thermal detection devices can then output a variable voltage potential.

At block 706 of FIG. 9, the voltage potential from the one or more thermal detection devices can be supplied to a microprocessor to power an automatic pilot valve. Gas can then flow through the automatic pilot valve to the pilot burner. In the exemplary embodiment depicted in FIG. 6, the one or more thermal detection devices 170 (shown in FIGS. 1-2) can supply a voltage potential to the microprocessor 640 sufficient to activate the microprocessor 640. The one or more thermal detection devices 170 can also supply a voltage potential to the microprocessor 640 sufficient to allow the microprocessor 640 to operate and open the electric servo operator valve 410. The flow of gas 365 through the servo valve 410 can relieve the gas pressure on the underside of the automatic pilot valve 400. The automatic pilot valve 400 can then open and allow gas flow through the automatic pilot valve 400 to the pilot outlet 470 and to the one or more pilot burners 190 (shown in FIG. 1). The microprocessor 640 can hold the servo valve 410 open as long as sufficient power is supplied to the microprocessor 640. Other means for opening the automatic pilot valve 400 are possible, as well.

At block 708 of FIG. 9, a user can operate a selectable input device to close the manual pilot valve. In the exemplary embodiment depicted in FIG. 6, the input device 310 can be spring loaded. In such a case, once the input device 310 is released after being actuated, it can spring back to its previous position and, via the shaft 385, close the manual pilot valve 390. Other examples are possible as well.

At block 710 of FIG. 9, gas can be supplied to one or more pilot burners via the automatic pilot valve that is being powered solely by the output voltage potential supplied by the one or more thermal detection devices.

Figure 10:
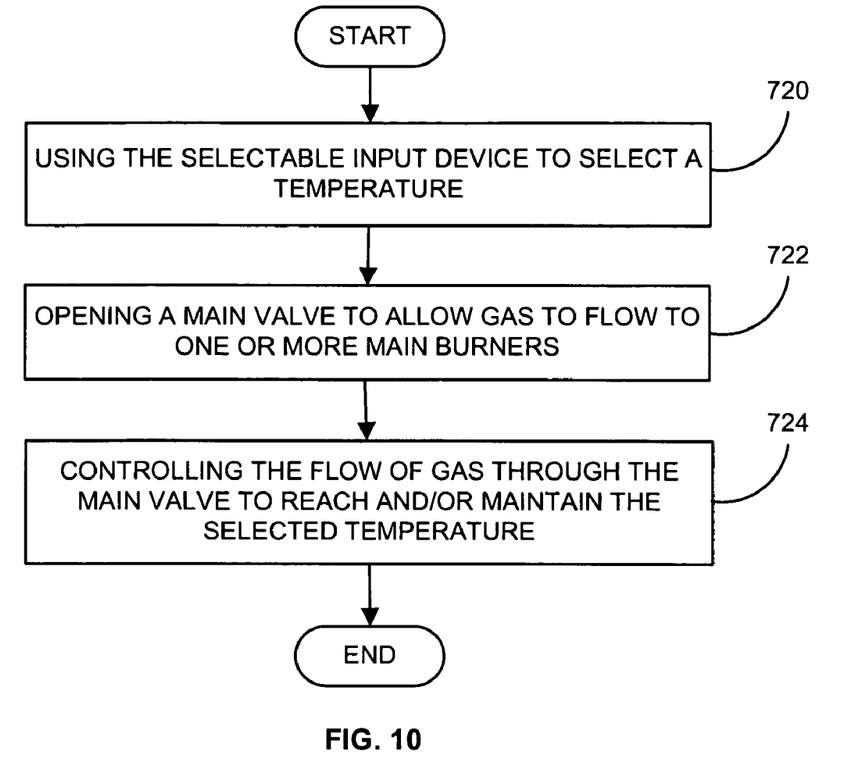
FIG. 10 is a flowchart illustrating a process carried out by a system in accordance with an exemplary embodiment.

FIG. 10 is a flowchart that depicts an additional set of functions that might be involved in using an exemplary pilot control system in accordance with the exemplary embodiments of FIGS. 1-8. As depicted in the exemplary embodiment of FIG. 7, the selectable input device 310 can be coupled to a potentiometer 600. The potentiometer 600 can, in turn, sense the position of the input device 310.

At block 720 of FIG. 10, a user can operate the selectable input device to select a temperature. For example, turning to FIG. 3, a user might select the low position 340, the hot position 350, the very hot position 360, or any of the intermediate temperature settings between the hot position 350 and the very hot position 360. The position of the input device 310 might then be relayed to the microprocessor 640 via the exemplary circuit 650 depicted in FIG. 8.

At block 722 of FIG. 10, the microprocessor can use the voltage potential from the one or more thermal detection devices to power a main valve. Gas can then flow through the main valve to the one or more main burners. In the exemplary embodiment depicted in FIG. 7, the one or more thermal detection devices 170 (shown in FIGS. 1-2) can supply a voltage potential to the microprocessor 640 sufficient to allow the microprocessor to operate the electric servo operator main valve 550. The flow of gas 365 through the servo valve 550 can relieve the gas pressure on the underside of the main valve 420. The main valve 420 can then open and allow gas flow through the main valve 420 to the outlet 380 and to the main burners (not shown). The microprocessor 640 can hold the main valve 410 open as long as sufficient power is supplied to the microprocessor 640. Other means for opening the main valve 420 are possible, as well.

At block 724 of FIG. 10, the microprocessor can control the flow of gas through the main valve to reach and/or maintain the selected temperature. In the exemplary embodiment depicted in FIG. 2, for example, temperature sensing devices 280 can provide temperature feedback to the microprocessor 640. Other examples are possible, as well. In any case, the microprocessor 640 can compare the temperature measured by the temperature sensing devices 280 to the selected temperature. The microprocessor 640 can then open, close, or otherwise change the amount of gas 365 flowing through the main valve 420 accordingly (by, for instance, adjusting the position of the electric servo valve 550).

Figure 11:
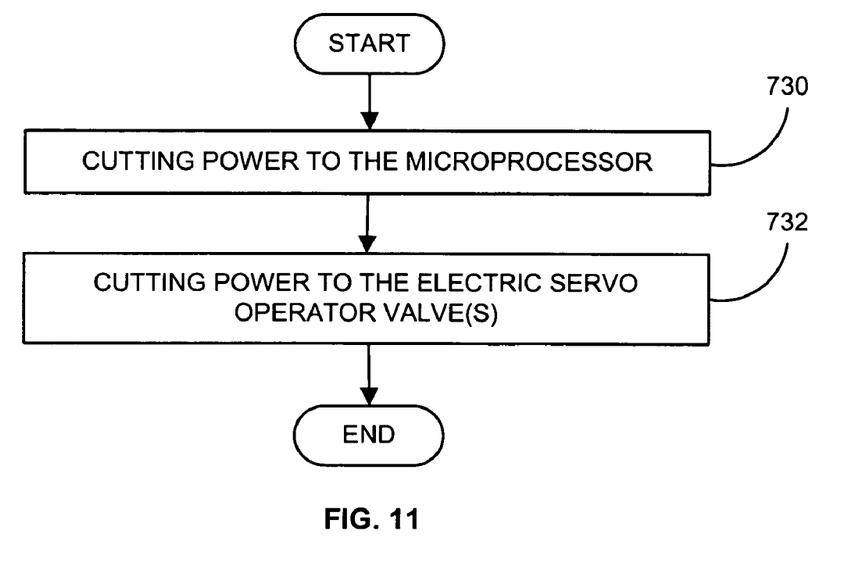
FIG. 11 is a flowchart illustrating a process carried out by a system in accordance with an exemplary embodiment.

FIG. 11 is a flowchart that depicts an additional set of functions that might be involved in using an exemplary pilot control system in accordance with the exemplary embodiments of FIGS. 1-8. As depicted in the exemplary embodiment of FIG. 6, the microprocessor 640 can supply power to the electric servo operator valve 410 to power the automatic pilot valve 400. And as depicted in the exemplary embodiment of FIG. 7, the microprocessor 640 can supply power to the electric servo operator main valve 550 to power the main valve 420.

At block 730 of FIG. 11, power to the microprocessor can be cut. In an exemplary embodiment, a user can cut power to the microprocessor 640 by setting the selectable input device 310 to the off position 320. Power to the microprocessor 640 might also be cut by the termination of the voltage potential from the one or more thermal detection devices 170, for example, by the main burner flame and/or the pilot flame 195 being extinguished.

At block 732 of FIG. 11, power to any electric servo operator valves can also be cut. In an exemplary embodiment, because the one or more thermal detection devices 170 supply the only power to the microprocessor 640, once the voltage potential from the thermal detection devices 170 is cut, any power that the microprocessor 640 supplies is also cut. The termination of power supplied by the microprocessor 640 to components of the pilot control system, such as the electric servo operator automatic pilot valve 410 and the electric servo operator main valve 550, can cause the automatic pilot valve 400 and the main valve 420, respectively, to close.

3. CONCLUSION

Several exemplary embodiments of the present invention have been described above. Those skilled in the art will understand, however, that changes and modifications may be made to these embodiments without departing from the true scope and spirit of the present invention, which is defined by the claims.

I claim:

1. A gas valve assembly, comprising:
a gas inlet in fluid communication with a first chamber;
a second chamber;
a first gas valve providing selective fluid communication between the second chamber and the first chamber;
a gas outlet;
a second gas valve providing selective fluid communication between the gas outlet and the second chamber;
a pilot light outlet in fluid communication with the second chamber; and
a bypass channel configured to provide fluid communication between the second chamber and the first chamber such that
when the first gas valve and the second gas valve are in a closed position, the bypass channel provides sufficient bypass gas flow to ignite a pilot flame at the pilot flame outlet, and when the first gas valve is in the closed position and the second gas valve is in an at least partially open position, the bypass channel limits bypass gas flow to an amount that is insufficient to ignite a pilot flame at the pilot light outlet.

2. The gas valve assembly according to claim 1 wherein the bypass channel comprises a fixed orifice.

3. The gas valve assembly according to claim 1 wherein the pilot light outlet comprises a pressure regulator.

4. The gas valve assembly according to claim 1 further comprising a bypass channel valve disposed within the bypass channel.

5. The gas valve assembly according to claim 1 wherein the bypass gas flow amount is insufficient to ignite a flame at the gas outlet when the first gas valve is in the closed position and the second gas valve in an at least partially open position.

6. The gas valve assembly according to claim 1 wherein the bypass channel has a minimum cross-sectional area in a range of 0.2 to 0.3 mm$^2$.

7. The gas valve assembly according to claim 1 wherein the pilot light outlet has a cross-sectional area in a range of 0.03 to 0.12 mm$^2$.

8. The gas valve assembly according to claim 1 wherein the gas outlet has a cross-sectional area in a range of 100 to 150 mm$^2$.

9. A method of preventing ignition of a pilot flame comprising the steps of:
providing a gas valve assembly comprising:
a gas inlet in fluid communication with a first chamber;
a first gas valve providing selective fluid communication between a second chamber and the first chamber;
a gas outlet;
a second gas valve providing selective fluid communication between the gas outlet and the second chamber;
a pilot light outlet in fluid communication with the second chamber; and
a bypass channel configured to provide fluid communication between the second chamber and the first chamber;
providing a first gas flow amount from the first chamber into the bypass channel to the second chamber when the first gas valve is in a closed position and the second gas valve is in an at least partially open position; and
flowing at least a portion of the first gas flow amount to the gas outlet and flowing a remaining portion of the first gas flow amount to the pilot light outlet, the remaining portion of the first gas flow amount being insufficient to ignite a pilot flame.

10. The method according to claim 9 wherein the step of providing a gas valve assembly comprises providing a bypass channel having an orifice sized to provide a first gas flow amount from the first chamber into the second chamber when the first gas valve is in the closed position and the second gas valve in an at least partially open position.

11. The method according to claim 9 further comprising a step of opening a bypass channel valve in fluid communication with the bypass channel to allow the first gas flow amount from the first chamber into the bypass channel to the second chamber.

12. The method according to claim 9 wherein the step of flowing at least a portion of the first gas flow amount to the gas outlet comprises flowing at least a portion of the first gas flow amount from the second chamber, past the at least partially open second gas valve, and into the gas outlet.

13. The method according to claim 9 wherein the step of flowing at least a portion of the first gas flow amount to the gas outlet comprises flowing at least a portion of the first gas flow amount from the second chamber, past the at least partially open second gas valve, and into the gas outlet and the first gas flow amount is insufficient to ignite a flame at the gas outlet.

14. The method according to claim 9 wherein the step of flowing at least a portion of the first gas flow amount to the gas outlet comprises flowing at least a portion of the first gas flow amount from the second chamber, past the at least partially open second gas valve, and into the gas outlet and the first gas flow amount being in a range of 350 to 550 BTU/hr.

15. The method according to claim 9 wherein the step of flowing at least a portion of the first gas flow amount to the gas outlet comprises flowing at least a portion of the first gas flow amount to the gas outlet and flowing a remaining portion of the first gas flow amount to the pilot light outlet, the remaining portion of the first gas flow amount being in a range of 0 to 350 BTU/hr.

16. The method according to claim 9 further comprising sealing the second chamber from the gas outlet by closing the second gas valve, and then igniting the first gas flow at the pilot light outlet.

17. A gas valve comprising:
a gas inlet in fluid communication with a first chamber;
a second chamber;
a first gas valve providing selective fluid communication between the second chamber and the first chamber;
a gas outlet;
a second gas valve providing selective fluid communication between the gas outlet and the second chamber;
a pilot light outlet in fluid communication with the second chamber; and
a bypass channel comprising a fixed orifice having a cross-sectional area in a range of 0.2 to 0.3 mm$^2$, the bypass channel configured to provide fluid communication between the second chamber and the first chamber such that the bypass channel
limits bypass gas flow to an amount that is insufficient to ignite a pilot flame at the pilot light outlet when the first gas valve is in a closed position and the second gas valve is in an at least partially open position.

* * * * *